(12) United States Patent
Divan

(10) Patent No.: US 9,048,654 B2
(45) Date of Patent: Jun. 2, 2015

(54) REDUCTION OF INRUSH CURRENT DUE TO VOLTAGE SAGS BY IMPEDANCE REMOVAL TIMING

(75) Inventor: Deepakraj Divan, San Jose, CA (US)

(73) Assignee: Georgia Tech Research Corporation, Atlanta, GA (US)

(*) Notice: Subject to any disclaimer, the term of this patent is extended or adjusted under 35 U.S.C. 154(b) by 483 days.

(21) Appl. No.: 13/274,513

(22) Filed: Oct. 17, 2011

(65) Prior Publication Data

US 2012/0032653 A1 Feb. 9, 2012

Related U.S. Application Data

(63) Continuation of application No. 12/090,968, filed as application No. PCT/US2006/039516 on Oct. 10, 2006, now Pat. No. 8,039,994.

(60) Provisional application No. 60/648,466, filed on Jan. 31, 2005.

(51) Int. Cl.
*H02H 7/00* (2006.01)
*H02H 9/00* (2006.01)
(Continued)

(52) U.S. Cl.
CPC ............ *H02H 9/001* (2013.01); *H01H 9/542* (2013.01); *H01H 9/56* (2013.01); *H02H 3/247* (2013.01)

(58) Field of Classification Search
CPC ......... H02H 9/001; H02H 9/002; H02H 3/12; H02H 3/24; H02H 3/247; H02H 1/043; H01H 9/56

USPC ............ 307/98, 99, 103, 115; 361/8, 9, 3, 71, 361/58; 323/901, 908; 363/49
See application file for complete search history.

(56) References Cited

U.S. PATENT DOCUMENTS 3,109,930 A 11/1963 MacDonald
3,558,952 A 1/1971 Forbes
(Continued)

FOREIGN PATENT DOCUMENTS

EP 0 708 515 A1 4/1996
EP 0 986 158 A1 3/2000
(Continued)

OTHER PUBLICATIONS

Duran-Gomez, Jose Luis, et al., An Approach to Achieve Ride-Through of an Adjustable-Speed Drive with Flyback Converter Modules Powered by Super Capacitors, IEEE Transactions on Industry Applications, Mar./Apr. 2002, pp. 514-522, vol. 38, No. 2, IEEE, USA.

(Continued)

*Primary Examiner* — Fritz M Fleming
(74) *Attorney, Agent, or Firm* — Morris, Manning & Martin, LLP; John R. Harris

(57) ABSTRACT

Various systems and methods are provided for minimizing an inrush current to a load after a voltage sag in a power voltage. In one embodiment, a method is provided comprising the steps of applying a power voltage to a load, and detecting a sag in the power voltage during steady-state operation of the load. The method includes the steps of adding an impedance to the load upon detection of the sag in the power voltage, and removing the impedance from the load when the power voltage has reached a predefined point in the power voltage cycle after the power voltage has returned to a nominal voltage.

51 Claims, 6 Drawing Sheets

(51) Int. Cl.
*H01H 9/54* (2006.01)
*H01H 9/56* (2006.01)
*H02H 3/247* (2006.01)

(56) References Cited

U.S. PATENT DOCUMENTS

| | | | |
|---|---|---|---|
| 3,935,511 A | | 1/1976 | Boulanger et al. |
| 3,935,527 A | * | 1/1976 | Michelet et al. ............... 363/49 |
| 3,982,137 A | | 9/1976 | Penrod |
| 4,183,071 A | * | 1/1980 | Russell ........................ 361/59 |
| 4,250,531 A | | 2/1981 | Ahrens |
| 4,328,459 A | * | 5/1982 | McLeod, Jr. ................ 323/300 |
| 4,396,882 A | | 8/1983 | Kellenbenz |
| 4,479,118 A | | 10/1984 | Cole, Jr. |
| 4,555,741 A | | 11/1985 | Masaki |
| 4,560,887 A | | 12/1985 | Schneider |
| 4,675,772 A | | 6/1987 | Epstein |
| 4,691,274 A | | 9/1987 | Matouk et al. |
| 4,858,054 A | * | 8/1989 | Franklin ........................ 361/57 |
| 4,924,342 A | | 5/1990 | Lee |
| 4,939,437 A | | 7/1990 | Farag et al. |
| 5,030,844 A | | 7/1991 | Li et al. |
| 5,032,738 A | | 7/1991 | Vithayathil |
| 5,063,303 A | | 11/1991 | Sackman et al. |
| 5,257,157 A | | 10/1993 | Epstein |
| 5,379,177 A | | 1/1995 | Bird |
| 5,386,183 A | | 1/1995 | Cronvich et al. |
| 5,448,442 A | | 9/1995 | Farag |
| 5,519,264 A | | 5/1996 | Heyden et al. |
| 5,519,295 A | | 5/1996 | Jatnieks |
| 5,537,021 A | | 7/1996 | Weinberg et al. |
| 5,563,459 A | | 10/1996 | Kurosawa et al. |
| 5,619,127 A | | 4/1997 | Warizaya |
| 5,627,738 A | | 5/1997 | Lubomirsky et al. |
| 5,642,007 A | | 6/1997 | Gyugyi et al. |
| 5,689,395 A | | 11/1997 | Duffy et al. |
| 5,737,161 A | | 4/1998 | Thomas |
| 5,864,458 A | | 1/1999 | Duffy et al. |
| 5,886,429 A | | 3/1999 | Grady et al. |
| 5,894,396 A | | 4/1999 | Kim |
| 5,907,192 A | | 5/1999 | Lyons et al. |
| 6,005,362 A | | 12/1999 | Enjeti et al. |
| 6,021,035 A | | 2/2000 | Larsen et al. |
| 6,046,921 A | | 4/2000 | Tracewell et al. |
| 6,112,136 A | | 8/2000 | Paul et al. |
| 6,118,676 A | | 9/2000 | Divan et al. |
| 6,163,469 A | * | 12/2000 | Yuki ............................... 363/53 |
| 6,184,593 B1 | | 2/2001 | Jungreis |
| 6,456,097 B1 | | 9/2002 | Sutherland |
| 6,538,864 B2 | | 3/2003 | Mullner |
| 6,597,144 B2 | | 7/2003 | Pearson et al. |
| 6,744,612 B2 | | 6/2004 | Chen |
| 6,744,613 B2 | | 6/2004 | McCook et al. |
| 6,862,201 B2 | | 3/2005 | Hodge, Jr. |
| 7,012,793 B2 | | 3/2006 | Cheevanantachai et al. |
| 7,049,710 B2 | | 5/2006 | Dahlman |
| 7,099,135 B2 | | 8/2006 | Ball et al. |
| 7,184,279 B2 | | 2/2007 | Lee |
| 7,355,294 B2 | | 4/2008 | Teichmann |
| 7,504,821 B2 | | 3/2009 | Shuey |
| 7,525,777 B2 | | 4/2009 | Aromin |
| 7,541,696 B2 | | 6/2009 | Dawley |
| 7,630,185 B2 | | 12/2009 | Fiesoli et al. |
| 7,957,117 B2 | | 6/2011 | Divan |
| 7,977,928 B2 | | 7/2011 | Fahrenbruch et al. |
| 8,035,938 B2 | | 10/2011 | Divan |
| 2001/0021091 A1 | | 9/2001 | Weichler |
| 2002/0012261 A1 | | 1/2002 | Moindron |
| 2002/0122318 A1 | | 9/2002 | Guerrera |
| 2002/0149891 A1 | | 10/2002 | Neiger et al. |
| 2003/0107859 A1 | | 6/2003 | Pan et al. |
| 2003/0222747 A1 | | 12/2003 | Perkinson et al. |
| 2005/0088792 A1 | | 4/2005 | Mechanic et al. |
| 2010/0091421 A1 | | 4/2010 | Lee |

FOREIGN PATENT DOCUMENTS

| | | |
|---|---|---|
| EP | 0 862 261 B1 | 1/2004 |
| FR | 2197258 A1 | 3/1974 |
| GB | 1076078 | 7/1967 |
| GB | 2284100 A | 5/1995 |
| JP | 6177634 | 5/1986 |
| JP | 05049167 | 2/1989 |
| JP | 05-252650 A | 9/1993 |
| JP | 2001-025256 | 1/2001 |
| JP | 2001-136657 | 5/2001 |
| JP | 2003259648 | 9/2003 |
| JP | 2004304876 | 10/2004 |
| WO | WO 00/59087 A1 | 10/2000 |

OTHER PUBLICATIONS

Electrotek, Voltage Sag Studies, http://www.electrotek.com/voltsag.htm, Feb. 16, 2006, pp. 1-5, Electrotek Concepts, USA.

Fischer, F. V., Applied Power Electronics in the Field of Voltage Dip-Proofing, http://www.measurlogic.com/Resources/PowerQuality_book.pdf, May 16, 2002, pp. 1-12, Dip-Proofing Technologies Inc., USA.

Stratford, J., et al., Applying Voltage Dip Proofing to Provide Ride-Through, http://www.electricenergyonline.com/?page=show_article&mag=11&article=81, Feb. 2003, pp. 1-8, Electric Energy Publications Inc., USA.

Int'l Search Rpt & WO, Mar. 13, 2006, Int'l Searching Authority.

* cited by examiner

REDUCTION OF INRUSH CURRENT DUE TO VOLTAGE SAGS BY IMPEDANCE REMOVAL TIMING

CROSS-REFERENCE TO RELATED APPLICATIONS

This application is a continuation of U.S. patent application Ser. No. 12/090,968, filed Apr. 21, 2008, entitled "REDUCTION OF INRUSH CURRENT DUE TO VOLTAGE SAGS," by Deepakraj M. Divan, now U.S. Pat. No. 8,039,994, which claims the benefit pursuant to 35 U.S.C. 119(e) of and is a U.S. national stage application of International Patent Application PCT/US2006/039516 filed on 10 Oct. 2006 entitled "REDUCTION OF INRUSH CURRENT DUE TO VOLTAGE SAGS", which claims priority to International Patent Application PCT/US2005/038471 filed on 24 Oct. 2005 entitled "Active Current Surge Limiters," which is incorporated herein by reference in its entirety. International Patent Application PCT/US2005/038471 incorporates by reference and claims priority to U.S. Provisional Patent Application 60/648,466 filed on 31 Jan. 2005 entitled "System and Method for Determining Power System transmission Line Information," which is also incorporated herein by reference in its entirety.

This application is also related to the following U.S. patent applications, each of which is a continuation of U.S. patent application Ser. No. 12/090,968, filed Apr. 21, 2008, now U.S. Pat. No. 8,039,994:

U.S. patent application Ser. No. 13/273,492, entitled "Reduction of Inrush Current Due to Voltage Sags with Switch and Shunt Resistance", filed on Oct. 14, 2011; and U.S. patent application Ser. No. 13/273,513, entitled "Reduction of Inrush Current Due to Voltage Sags by an Isolating Current Limiter", filed on Oct. 14, 2011.

BACKGROUND

Although lightning strikes high voltage power lines very frequently, lightning generally causes a high voltage surge within a short distance, say around 200 meters, of the impacted site. Consequently, relatively few end users of electronic equipment are affected. Transient Voltage Surge Suppressors (TVSS) devices protect against such rare but damaging voltage surges. On the other hand, every lightning strike on a power line or other power system fault causes a short-duration voltage sag that lasts typically less than six cycles, impacting customers up to 200 miles away. As a result, end users of electronic equipment such as computers, televisions, medical equipment, etc., are likely to experience voltage sags much more frequently than voltage surges.

In addition, during start up of electronic equipment, there is often an inrush current that may cause damage to electrical components. To limit the damaging effects of such inrush currents, a thermistor may typically be employed that limits inrush current upon startup of electronic equipment. Specifically, a thermistor might be operated to inject an impedance such as a resistance into a power circuit to limit the inrush current when the thermistor is cool at startup of the electronic equipment. However, after startup, a thermistor is heated, thereby reducing the inserted resistance. As a result, the thermistor no longer functions as a current inrush limiter. This can be problematic due to the common occurrence of voltage sags. At the end of a voltage sag that occurs after start up, the AC line voltage may abruptly return to normal potentially causing a large current surge that is not limited due to the fact that the thermistor is disengaged after start up.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
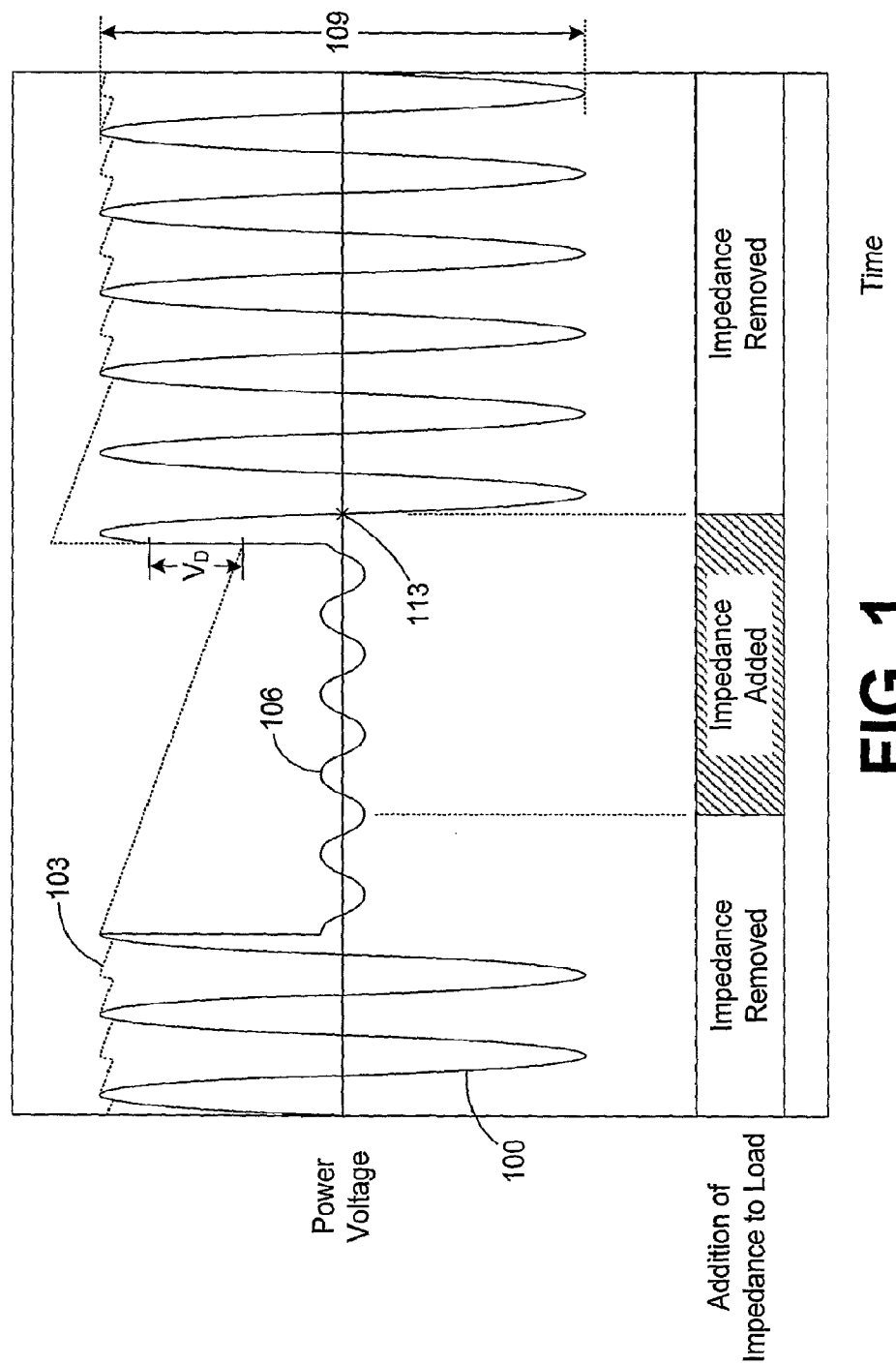
FIG. 1 depicts one example of a plot of a line voltage with respect to time that illustrates the timing relating to the insertion and removal of a current limiting impedance in association with the voltage sag according to an embodiment of the present invention.

With reference to FIG. 1, shown is a chart that plots a power voltage 100 with respect to time to illustrate the various embodiments of the present invention. The power voltage 100 is applied to a load that may comprise, for example, an inductive load, a rectifier load, a capacitive load, or other type of electrical load as can be appreciated. In the case that the power voltage 100 is applied to a rectifier load, then a voltage is generated across a capacitor associated with the rectifier as can be appreciated. In this respect, the capacitor facilitates the generation of a DC power source in conjunction with the function of the diodes of the rectifier.

With respect to FIG. 1, the capacitor voltage 103 is depicted as the DC voltage that exists across a capacitor associated with the rectifier. From time to time during the steady state operation of the load to which the power voltage 100 is applied, a voltage sag 106 may occur in the power voltage 100. During a voltage sag 106, the capacitor voltage 103 may steadily decrease as the capacitor itself is drained as it supplies current to the electrical load coupled to the rectifier. At the end of a voltage sag 106, it is often the case that the power voltage 100 suddenly returns to a nominal voltage 109. The nominal voltage 109 is the normal operating voltage of the power voltage 100.

Depending where in the power voltage cycle that the power voltage 100 returns to the nominal voltage 109, there may be a significant voltage differential $V_D$ between the power voltage 100 and the capacitor voltage 103. This voltage differential $V_D$ may ultimately result in a significant inrush current as the load resumes steady state operation. Where the load is a rectifier load, then the inrush current occurs due to the fact that the rectifier capacitor needs to be charged up and other components that make up the load may pull more current at the end of the voltage sag 106.

The magnitude of the inrush current is affected by various load factors such as, for example, the type of load, the condition of load, the proximity of the load with respect to the power voltage 100, power supply factors, the duration of the voltage sag 106, the line impedance, and the location of any transformer associated with the stepping the power voltage 100 up or down, and other factors. In addition, the magnitude of any inrush current after the occurrence of a voltage sag 106 will depend upon the magnitude of the voltage differential $V_D$ that exists at the instant that the power voltage 100 returns to the nominal voltage 109. The nominal voltage 109 is defined herein as a nominal value assigned to a circuit or system for the purpose of conveniently designating its voltage class or type. In this sense, nominal voltage may comprise a standardized voltage specified for various purposes such as power distribution on a power grid, i.e. 120/240 Delta, 480/277 Wye, 120/208 Wye or other specification. Alternatively, the nominal voltage may comprise a standardized voltage in a closed system such as, for example, a power system on a vehicle such as an airplane, etc. A nominal voltage may be, for example, an AC voltage specified in terms of peak to peak voltage, RMS voltage, and/or frequency. Also, a nominal voltage may be a DC voltage specified in terms of a voltage magnitude.

In order to limit the inrush current at the end of a voltage sag 106, according to various embodiments of the present invention, an impedance is added to the load upon detection of the voltage sag 106 in the power voltage 100 during the steady state operation of the load. In this respect, the power voltage 100 is monitored to detect a voltage sag 106 during the steady state operation of the load. Once an occurrence of a voltage sag 106 is detected, the impedance is added to the load. Thereafter, the impedance is removed when the power voltage 100 has reached a predefined point 113 in the power voltage cycle after the power voltage 100 has returned to the nominal voltage 109.

The timing of the removal of the impedance from the load after the power voltage 100 has returned to the nominal voltage 109 is specified to as to minimize an occurrence of an inrush current surge flowing to the load according to various embodiments of the present invention. In this respect, the removal of the impedance from the load is timed at the predefined point on the power voltage cycle of the power voltage 100.

In one embodiment, the impedance is removed from the load when the power voltage 100 is less than a magnitude of the capacitor voltage 103 across a capacitor associated with a rectifier, where the load is a rectifier load. In such a scenario, given that the line voltage 100 is rectified, then it can be said that the impedance is removed from the load when the absolute value of the magnitude of the power voltage 100 is less than a magnitude of the voltage 103 across the capacitor associated with the rectifier of the load.

At such time, the respective diodes in the rectifier are reversed biased when the absolute value of the magnitude of the power voltage 100 is less than the magnitude of the voltage 103 across the capacitor associated with the rectifier of the load. Consequently, there is no inrush current when the absolute value of the magnitude of the power voltage 100 is less than the magnitude of the voltage 103 across a capacitor associated with a rectifier of the load. Ultimately, in this scenario, the capacitor associated with the rectifier is charged when the normal peaks of the rectified power voltage 100 are applied to the capacitor, rather than experiencing an instantaneous change in the voltage as illustrated by the voltage differential $V_D$ depicted in FIG. 1.

In an additional alternative, the impedance is removed from the load at approximately a zero (0) crossing of the power voltage 100 that occurs after the power voltage has returned to the nominal voltage 109 after the end of a voltage sag 106. In this respect, to be "approximate" to the zero crossing, for example, is to be within an acceptable tolerance associated with the zero crossing such that the magnitude of the power voltage 100 is unlikely to be greater than a voltage 103 across a capacitor associated with a rectifier of the load.

In another embodiment, the impedance may be removed from the load at approximately a first one of the many zero crossings that occur after the power voltage 100 as returned to the nominal voltage 109. This is advantageous as the power is returned to the load as soon as possible but in a manner that minimizes the possibility that a significant inrush current will occur.

In yet another embodiment, the impedance may be removed from the load at a point on the power voltage cycle that substantially minimizes the differential $V_D$ between an absolute value of the magnitude of the power voltage 100 and a magnitude of the voltage 103 across a capacitor associated with a rectifier of the load. In this respect, if the power voltage 100 returns to the nominal voltage 109 at a location in the power voltage cycle such that the magnitude of the power voltage 100 is close to the voltage 103 across the capacitor so that minimal inrush current may result, then the impedance may be removed potentially even in a case where the power voltage 100 is on an upswing and is greater than the voltage 103 across the capacitor, as long as the voltage differential $V_D$ is small enough so as to result in an acceptable amount of inrush current to the load.

In such a case, a maximum voltage differential $V_D$ may be specified that results in a maximum allowable inrush current that could be applied to the load, where the impedance would not be removed if the actual voltage differential $V_D$ is greater than the maximum voltage differential $V_D$ specified. As depicted in the graph of FIG. 1, shown is an embodiment in which the impedance is added to the load during the voltage sag 106 and is removed at the point 113 in the power voltage cycle that occurs at a first zero crossing after the power voltage 100 returns to the nominal voltage 109 according to one embodiment of the present invention.

Figure 2:
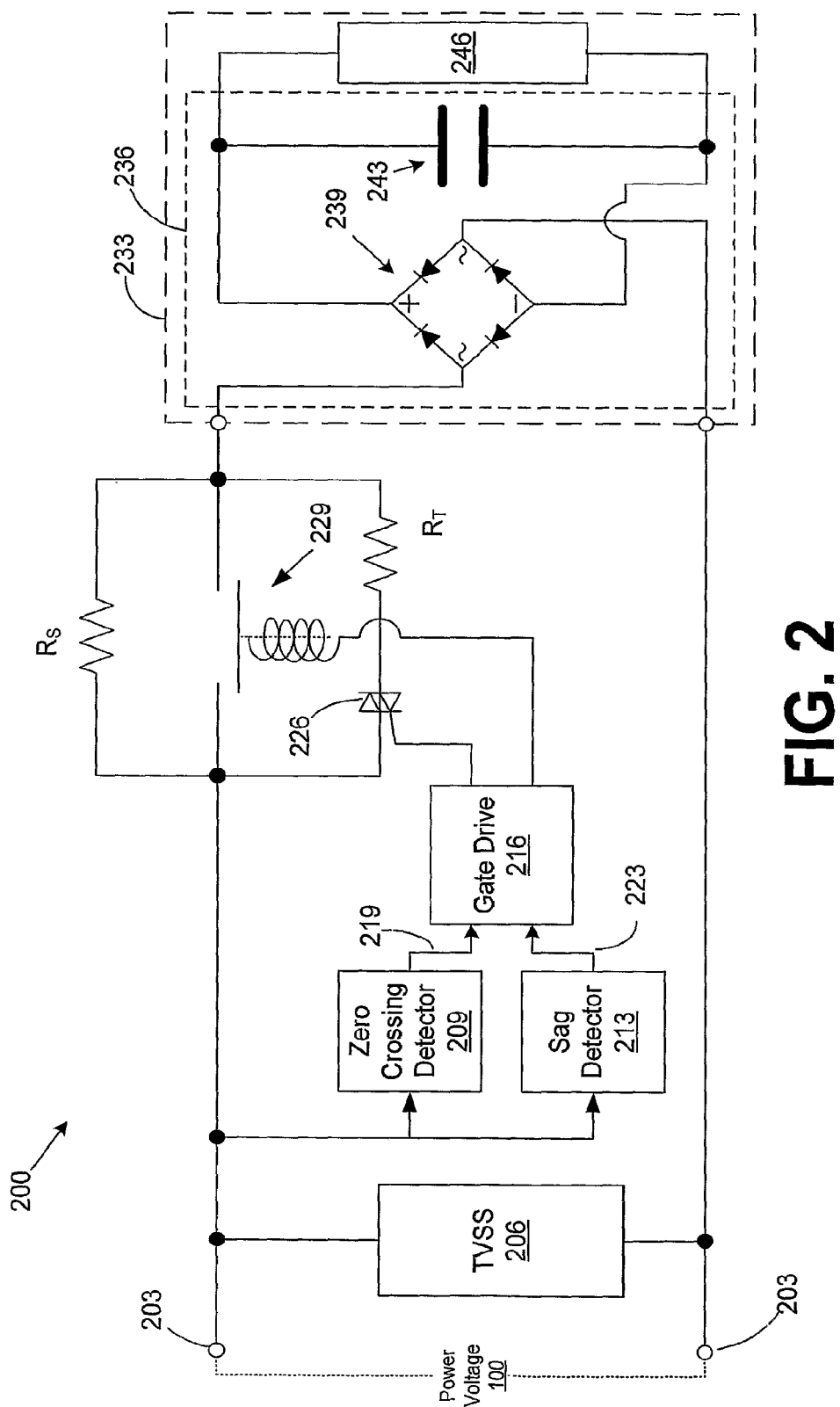
FIG. 2 is a schematic of one example of a current limiting circuit that operates to time the removal of a current limiting impedance as illustrated, for example, in FIG. 1 according to an embodiment of the present invention.

With reference next to FIG. 2, shown is a schematic of a current limiting circuit according to an embodiment of the present invention. The power voltage 100 (FIG. 1) is applied across input nodes 203 as shown. The power voltage 100 may be received from a typical outlet or other power source as can be appreciated. The current limiting circuit 200 includes a transient voltage surge suppressor 206 that is coupled across the input nodes 203. In addition, the current limiting circuit 200 includes a zero crossing detector 209, a sag detector 213, and a gate drive 216. The power voltage 100 is received as an input into both the zero crossing detector 209 and the sag detector 213. The output of the zero crossing detector 209 comprises a zero crossing signal 219 that is applied to the gate drive 216.

The output of the sag detector 213 is also applied to the gate drive 216. The gate drive 216 controls a thyristor 226 and a relay 229. In this respect, the gate drive 216 controls whether the thyristor 226 and the relay 229 are turned on or off. The relay 229 couples the input nodes 203 to a load 233. The thyristor 226 couples the input nodes 206 to the load 233 through a resister $R_T$. In the embodiment depicted in FIG. 2, the input nodes 203 are coupled to the load 233 through resistor $R_S$ that is in parallel with the relay 229 and the thyristor 226/resistor $R_T$ as shown.

The load 233 as depicted in FIG. 2 comprises a rectifier load having a rectifier 236. The rectifier 236 includes the diodes 239 and the rectifier capacitor 243. In addition, the load 233 may include other components 246 that receive DC power as can be appreciated. Alternatively, the load 233 may be an inductive load or other type of load. The zero crossing detector 209, the sag detector 213, and/or the gate drive 216 may be implemented with one or more micro processor circuits, digital logic circuitry, or analog circuitry as can be appreciated.

Next, a general discussion of the operation of the current limiting circuit 200 is provided according to one embodiment of the present invention. To begin, assume the power voltage 100 comprises a nominal voltage 109 is applied to the load and suddenly experiences a voltage sag 106 (FIG. 1). Assuming that the voltage sag 106 lasts a predefined threshold of time where the capacitor voltage 103 (FIG. 1) across the capacitor 243 drains appreciably, a risk is created of a significant inrush current when the power voltage 100 resumes the nominal voltage 109.

During steady state operation of the load, the relay 229 is in a closed position and the power voltage 100 is applied directly to the load 233 through the relay 229. Given that the relay 229 is a direct electrical connection, it presents the path of least resistance for the current flowing to the load 233. Consequently, the current bypasses the resistor $R_S$. During the steady state operation of the load, the thyristor 226 is also in an off state, thereby preventing current from flowing through the resistance $R_T$. Once the sag detector 213 detects the voltage sag 106, then the sag detector output 223 directs the gate drive 216 to open the relay 229. As a result, the voltage at the input nodes 223 is applied to the load 233 through the resistor $R_S$.

The resistance $R_S$ is obviously higher than the near zero resistance presented by the closed relay 229. By opening the relay 229, the resistor $R_S$ is added to the load 233. The resistance $R_S$ is specified so as to limit the current that can flow to the load 233. This resistance thus limits any current surge that might occur when the voltage returns to nominal and the voltage sag 106 has ended, thereby minimizing or eliminating the possibility of damage to electrical components of the load 233 such as diodes 239 in the rectifier 236 or other components.

It should be noted that the resistance $R_S$ may also reduce the voltage that is seen by the load 233 during the voltage sag 106 until either the thyristor 226 is closed (turned on) or the relay 229 is closed. In this respect, the resistance $R_S$ can exacerbate the reduced voltage experienced by the load 233 during the voltage sag 106. However, the reduced voltage due to the resistor $R_S$ will not be much worse than what can typically be experienced by the load 233 without the resistance $R_S$. This is especially true if the voltage sag 106 lasts for a short time. If the voltage sag 106 lasts for relatively long time such that the operation of the load is disrupted, chances are any reduction in voltage due to the resistance $R_S$ would not be of any consequence.

For maximum protection, the current flow through the resistor $R_S$ should be low, but as stated above, this might increase the possibility of momentary interference with the load operation. Thus, the value of the resistance $R_S$ is determined based upon a trade off between protection in a multi-load environment and the possibility of nuisance interference with the operation of the load 233. Experiments show that the resistance $R_S$ generally does not interfere with the load operation for voltage sags of short duration lasting less than five (5) cycles or so.

Once the relay 229 is opened due to the detection of the voltage sag 106, then the current limiting circuit 200 stays in such state until the sag detector 213 detects that the voltage sag 106 has ended. Assuming that the voltage sag 106 has ended, then the sag detector output 223 is appropriately altered. In response, the gate drive 216 does not close the relay 229 right away. Rather, the relay 229 is maintained in an open state. The gate drive 216 waits until a signal is received from the zero crossing detector 209 indicating that a zero crossing has been reached in the power voltage cycle. The zero crossing output 219 applied to the gate drive 216 indicates the occurrence of all zero crossings.

Upon receiving an indication of a zero crossing after receiving an indication that the voltage sag 106 has ended, the gate drive 216 turns on the thyristor 226 to allow current to flow to the load 223 through the thyristor 226 and the resistance $R_T$. The resistance $R_T$ is specified to protect the thyristor 266. In particular, the resistance $R_T$ limits the worst case current that flows to the load 233 through the thyristor 226 to within the maximum current rating of the thyristor 226. Thus, the resistance $R_T$ is less than the resistance $R_S$ and effectively allows the nominal power voltage 100 to be applied to the load 233. The thyristor 226 is advantageously employed to cause the power voltage 100 to be reapplied to the load 233 after the end of the voltage sag 106 as the thyristor 226 is much faster in operation than the relay 229. In this respect, the thyristor 226 can be turned on, for example, within approximately 10 microseconds as opposed to the relay 229 that might take approximately five to ten milliseconds. Because of the speed at which the thyristor 226 can operate, the thyristor 226 allows the current limiting circuit 200 to control exactly where on the power voltage cycle that the power voltage 100 is reapplied to the load 233.

Alternatively, if the reaction time of the relay 229 in response to a change in the state of the output signal from the gate drive 216 is sufficiently fast or can be estimated with sufficient accuracy, then it may be the case that the relay 229 could be used without the thyristor 229. Specifically, the relay 229 could be triggered to close (or turned off in the case of a normally closed relay) at a predefined period of time before a zero crossing is to occur with the anticipation that the relay 229 will actually close on or near the zero crossing itself. This embodiment would thus eliminate the need for the thyristor 226 and the resistance $R_T$.

Once the thyristor 226 has been on for a necessary amount of time to ensure that the capacitor 243 associated with the rectifier 236 is charged enough to avoid significant inrush current, or that the load 233 is operational to the extent that it will not cause an undesirable inrush current, the gate drive 216 closes the relay 229 to reestablish the conductive pathway between the input nodes 203 and the load 233. Thereafter, the gate drive 216 turns the thyristor 226 off.

Thus, to recap, the thyristor 226 provides the function of supplying the power voltage 100 to the load 233 after the end of the voltage sag 106. Given that the resistance $R_S$ is the impedance that is added to the load 233 during the voltage sag 106, the thyristor 226 acts to remove the impedance $R_S$ to resupply the power voltage 100 to the load 233, where the resistance $R_T$ is much less than the resistance $R_S$. Thereafter, the relay 229 is closed so that a direct conductive pathway is established to the load 233 without any loss to either of the resistances $R_S$ or $R_T$.

The current limiting circuit 200 illustrates the operation of an embodiment in which the inrush current that flows to the load 233 is minimized after the end of the voltage sag 106, where the impedance represented by the resistance $R_S$ that was added to the load 233 is removed from the load 233 at approximately the zero crossing of the power voltage 100 after the power voltage 100 has returned to the nominal voltage 109.

The precise zero crossing detected by the zero crossing detector 209 at which the thyristor 226 is turned on may be the first zero crossing that occurs after the power voltage 100 has returned to the nominal voltage 109. Alternatively, the zero crossing at which the thyristor 226 is turned on may be any zero crossing that occurs after the power voltage 100 has returned to the nominal voltage 109 with the understanding that it may be favorable to turn the thyristor 226 on as soon as possible so as to reestablish the power voltage 100 at the load 233 so that the load is not adversely affected.

In addition, the resistance $R_T$ is specified so that the thyristor 226 does not experience currents that are too high that may adversely affect its operation, taking into account how long the thyristor 226 would have to stay on given the zero crossing or other point at which the thyristor 226 would be turned on after the voltage sag 106 has ended.

Figure 3:
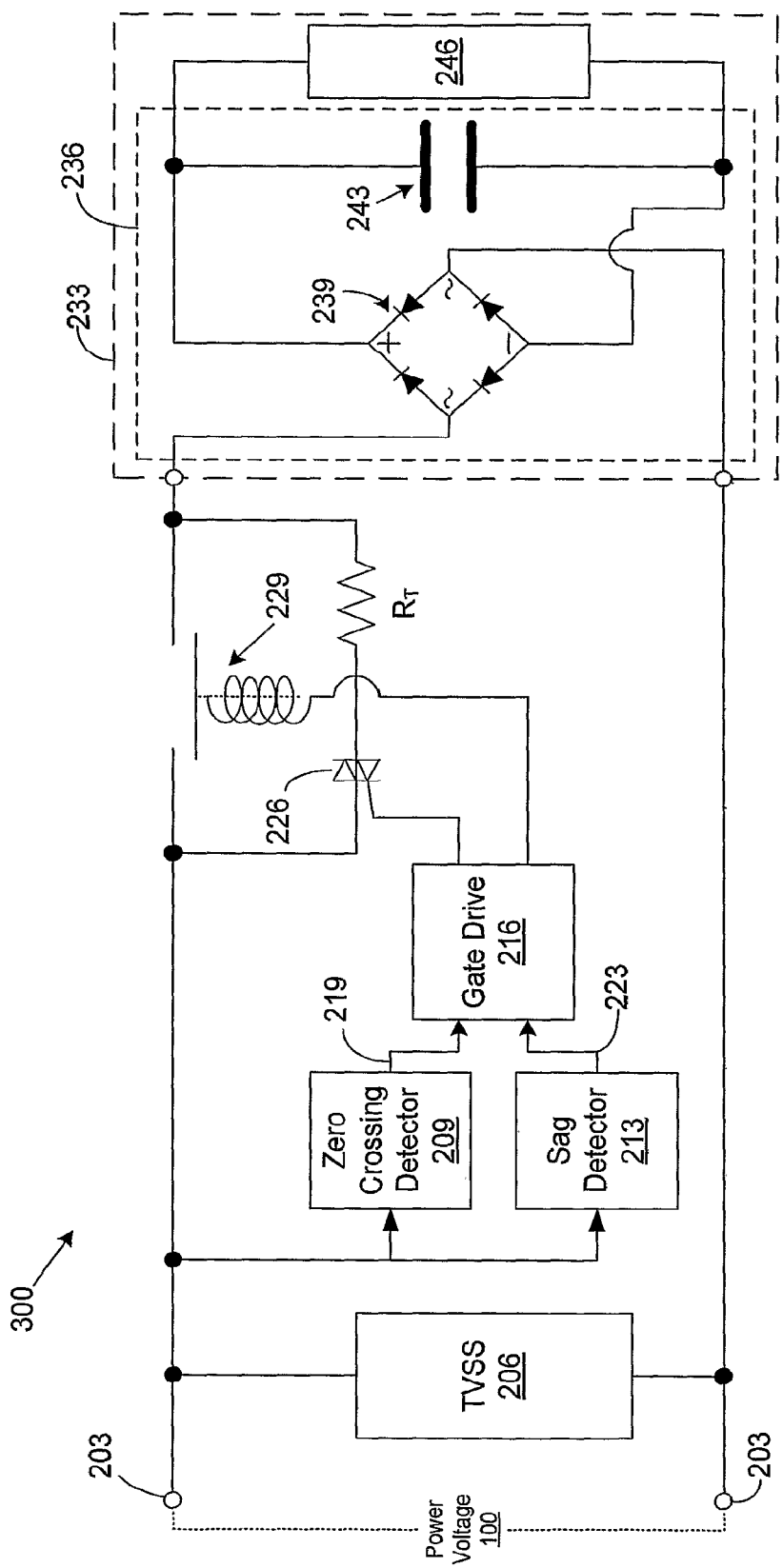
FIG. 3 is a schematic of another example of a current limiting circuit that operates to time the removal of a current limiting impedance as illustrated, for example, in FIG. 1 according to an embodiment of the present invention.

Referring next to FIG. 3, shown is a current limiting circuit 300 according to another embodiment of the present invention. The current limiting circuit 300 is similar in function with respect to the current limiting function 200, except that the resistance $R_S$ is not employed. In this respect, the impedance added to the load 233 is the equivalent of an infinite resistance or an open circuit. In all other ways, the operation of the current limiting circuit 300 is the same as described above with respect to FIG. 2.

In addition, the current limiting circuit 300 provides additional capability in that it can isolate the load 233 from the power voltage 100 such as might be desirable in a case where sustained undervoltages or overvoltages occur that may be dangerous for the load 233. The current limiting circuit 200 (FIG. 2) may also be configured to isolate the load 233 in the case of an undervoltage or overvoltage that might present a danger for the load 233 by including a second relay in series with the resistance $R_S$ that would open up to isolate the load 233 from the power voltage 100. In case an undervoltage or overvoltage is detected, a relay may be opened at the same time that the relay 229 is opened.

Figure 4:
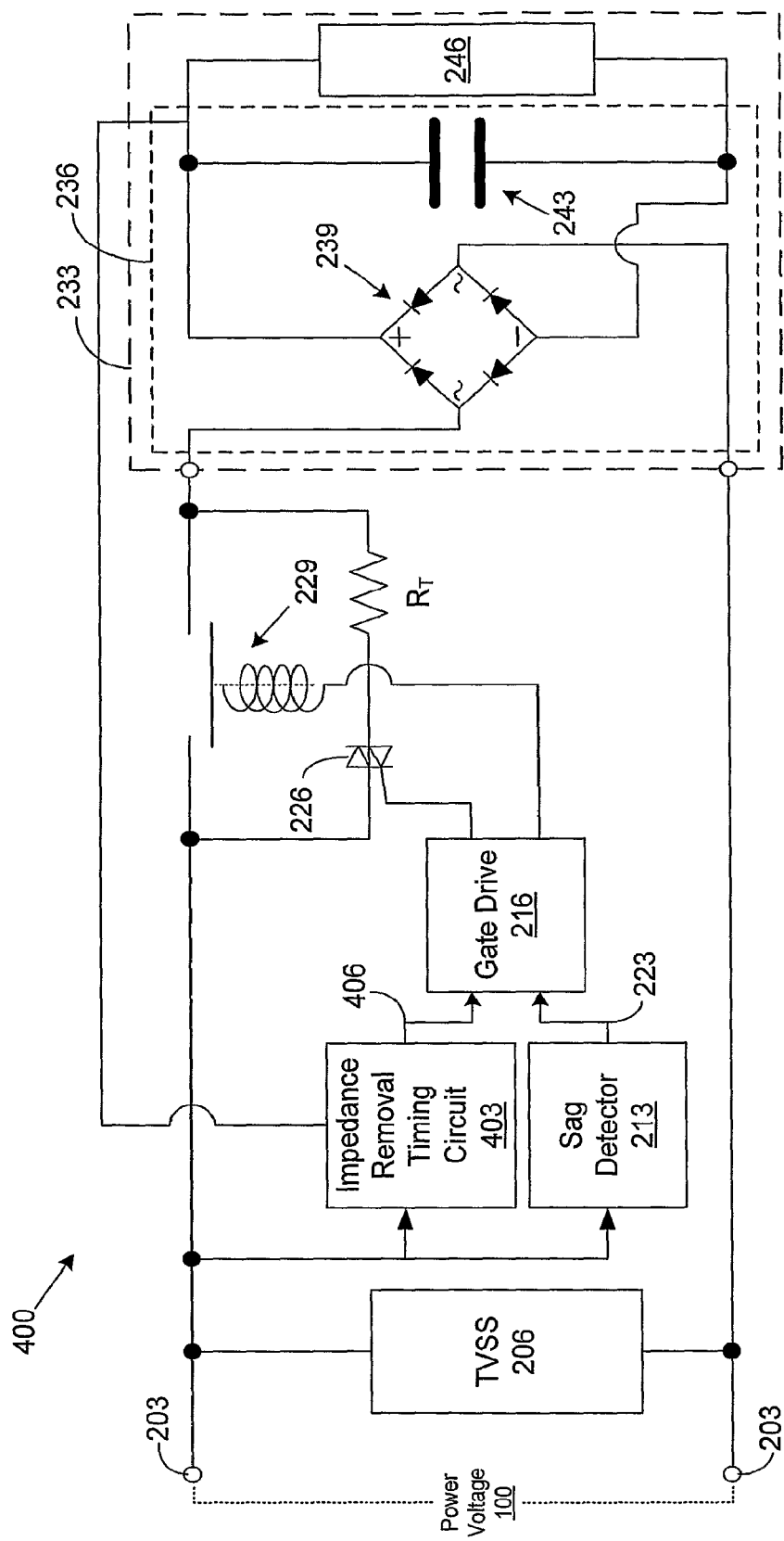
FIG. 4 is a schematic of yet another example of a current limiting circuit that operates to time the removal of a current limiting impedance as illustrated, for example, in FIG. 1 according to an embodiment of the present invention.

Turning then to FIG. 4, shown is a current limiting circuit 400 according to yet another embodiment of the present invention. The current limiting circuit 400 is similar to the current limiting circuit 300 (FIG. 3) with the exception that the zero crossing detector 209 in the current limiting circuit 300 has been replaced by the impedance removal timing circuit 403 that generates an impedance removal signal 406 that is applied to the gate drive 216. The current limiting circuit 400 operates in much the same way as the current limiting circuit 300 with the exception that the impedance removal timing circuit 403 receives the voltage across the capacitor 243 of the rectifier 236 as an input. This voltage may be compared with the power voltage 100 that is received as another input.

In this respect, the impedance removal timing circuit 403 may send the signal to the gate drive 216 to energize the thyristor 226 to supply current to the load 233 when conditions other than zero crossings occur that will allow the load 233 to be supplied with the line voltage without causing an undesirable inrush current surge. In particular, the conditions may comprise, for example, when the absolute value of the magnitude of the power voltage 100 is less than the magnitude of the rectified voltage across the capacitor 243 associated with the rectifier of the load. In this respect, the voltage differential $V_D$ (FIG. 1) does not exist such that a significant inrush current surge is not likely to be experienced.

Alternatively, the impedance removal timing circuit 403 may generate the impedance removal output signal 406 that causes the gate drive 216 to energize the thyristor 226 to remove the impedance from the load 233 at any point on the power voltage cycle of the power voltage 100 that substantially minimizes a differential between the absolute value of the magnitude of the power voltage 100 and a magnitude of the rectified voltage across the capacitor 243 that is associated with the load.

Figure 5:
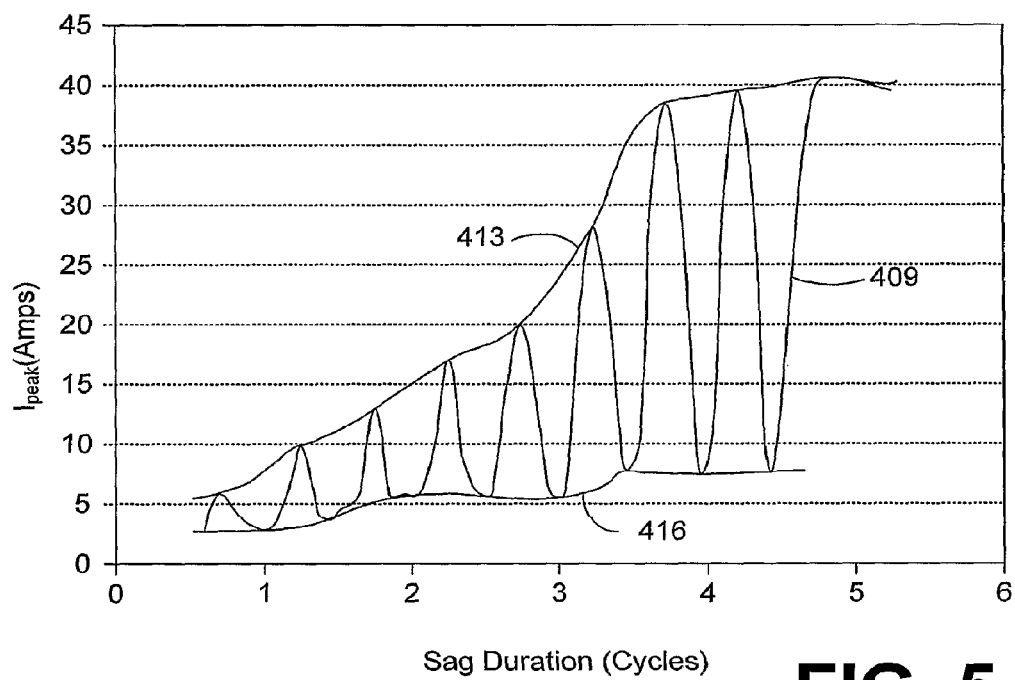
FIG. 5 is a graph that plots one example of an inrush surge current with respect to a duration of a sag in a power voltage such as the voltage sag illustrated in the example depicted in FIG. 1, where the inrush surge current depicted provides one example basis for determining where the current limiting impedance depicted with respect to FIG. 2, 3, or 4 should be removed according to an embodiment of the present invention.

Referring next to FIG. 5, shown is a chart that plots an example of the magnitude of the peak value of the inrush current surge that flows into a load as a function of the duration of a voltage sag 106 (FIG. 1) in terms of line voltage cycles. As shown in FIG. 5, the peak value of the measured inrush current surge 409 is depicted for various values of voltage sag duration for a typical liquid crystal monitor load. The inrush current surge 409 has an upper envelope 413, depicting the worst case stresses that are possible, and a lower envelope 416 that shows significantly lower inrush current values that may be achieved when normal load operation is resumed coincident with a line zero voltage crossing. The upper envelope follows the upper peaks of the inrush current surge 409 and the lower envelope 416 follows the lower peaks of the inrush current surge 409.

As can be seen, the peak value of the measured inrush current surge 409 potentially increases in time in proportion with the decay, for example, of the voltage experienced across a capacitor 403 (FIGS. 2-4) during a voltage sag 106. Even with the increase of the size of the peaks of the inrush current surge as the duration of the voltage sag 106 increases, there are still significant valleys and lower currents throughout the voltage sag duration. As such, it is desirable to ensure that the inrush current surge 409 falls at the bottom of a valley of the various peaks shown which generally coincide with the zero crossings of the power voltage 100 as can be appreciated.

Figure 6:
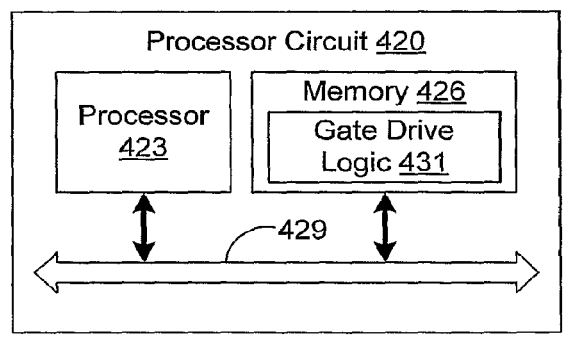
FIG. 6 is a schematic diagram of one example of a processor circuit that executes gate drive logic as employed in the current limiting circuits of FIG. 2, 3, or 4 according to an embodiment of the present invention.

Turning then to FIG. 6, shown is a processor circuit according to an embodiment of the present invention that provides one example of an implementation of the gate drive 216 according to an embodiment of the present invention. As depicted, a processor circuit 420 is shown having a processor 423 and a memory 426, both of which are coupled to a local interface 429. The local interface 429 may comprise, for example, a data bus with an accompanying control/address bus as can be appreciated by those with ordinary skill in the art. In this respect, the processor circuit 420 may comprise any one of a number of different commercially available processor circuits. Alternatively, the processor circuit 420 may be implemented as part of an application specific integrated circuit (ASIC) or may be implemented in some other manner as can be appreciated. It is also possible that the logic control functions can be implemented without a microprocessor.

Stored on the memory 426 and executable by the processor 423 is gate drive logic 431. The drive logic 431 is executed to control the function of the gate drive 216 in controlling the opening and closing of the relay 229, and to turn the thyristor 226 (FIGS. 2-4) on or off. In addition, an operating system may also be stored on the memory 426 and executed by the processor 423 as can be appreciated. Still further, other logic in addition to the gate drive logic 431 may be stored in the memory 426 and executed by the processor 423. For example, logic that implements the functions of the zero crossing detector 209 (FIGS. 2 and 4), sag detector 203 (FIG. 2, 3, or 4), or the impedance removal timing circuit 403 (FIG. 4) may be implemented on the processor circuit 420 as can be appreciated. Alternatively, separate processor circuits may be employed to implement each of the gate drive 216, zero crossing detector 209, sag detector 203, or the impedance removal timing circuit 403.

The gate drive logic 431, zero crossing detector 209, sag detector 203, and/or the impedance removal timing circuit 403 (FIG. 4) is described as being stored in the memory 426 and are executable by the processor 423. The term "executable" as employed herein means a program file that is in a form that can ultimately be run by the processor 423. Examples of executable programs may be, for example, a compiled program that can be translated into machine code in a format that can be loaded into a random access portion of the memory 426 and run by the processor 423 or source code that may be expressed in proper format such as object code that is capable of being loaded into a of random access portion of the memory 426 and executed by the processor 423, etc. An executable program may be stored in any portion or component of the memory 426 including, for example, random access memory, read-only memory, a hard drive, compact disk (CD), floppy disk, or other memory components.

The memory 426 is defined herein as both volatile and nonvolatile memory and data storage components. Volatile components are those that do not retain data values upon loss of power. Nonvolatile components are those that retain data upon a loss of power. Thus, the memory 426 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 423 may represent multiple processors and the memory 426 may represent multiple memories that operate in parallel. In such a case, the local interface 429 may be an appropriate network that facilitates communication between any two of the multiple processors, between any processor and any one of the memories, or between any two of the memories etc. The processor 423 may be of electrical, optical, or molecular construction, or of some other construction as can be appreciated by those with ordinary skill in the art.

Figure 7:
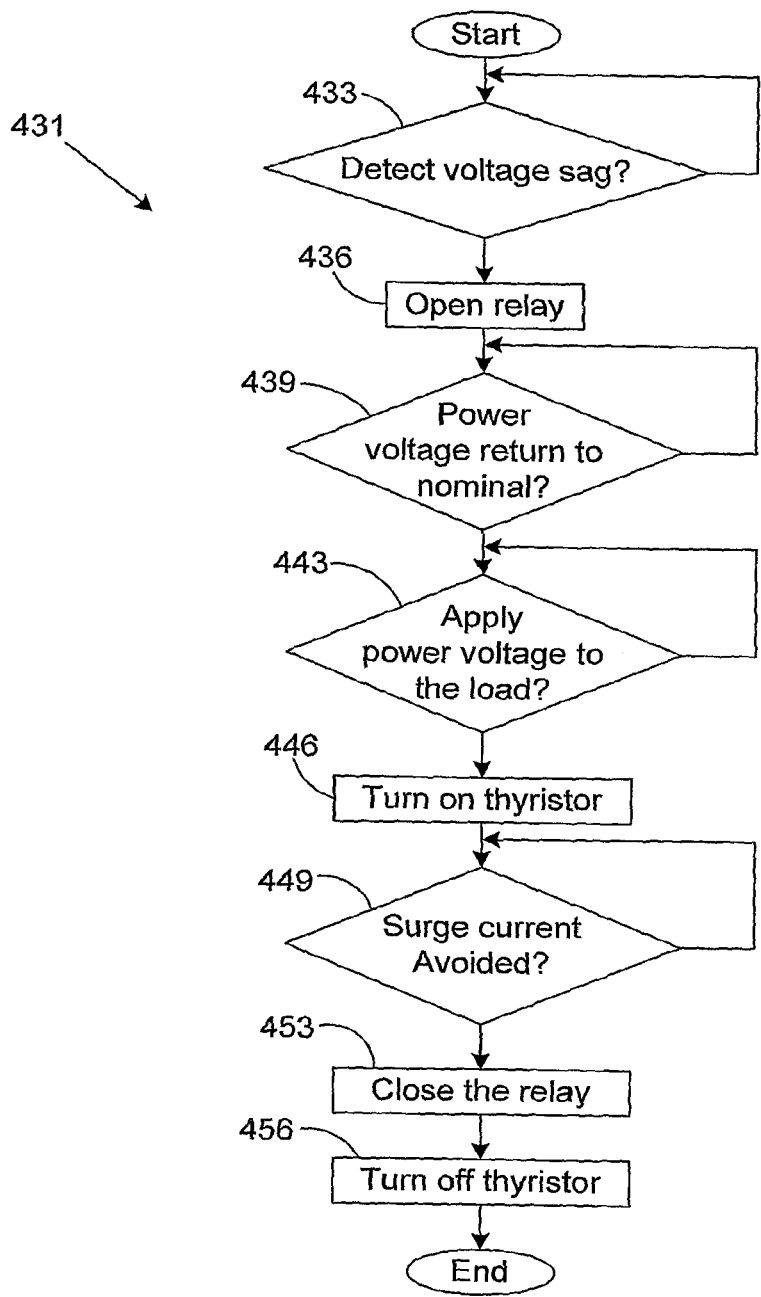
FIG. 7 is a flow chart of one example of the gate drive logic executed in the processor of FIG. 5 according to an embodiment of the present invention.

Referring next to FIG. 7, shown is a flow chart that provides one example of the operation of the gate drive logic 431 according to an embodiment of the present invention. Alternatively, the flow chart of FIG. 7 may be viewed as depicting steps of an example of a method implemented by the processor circuit 420 to prevent an inrush current surge to the load 233 (FIGS. 2-4) after a voltage sag 106 (FIG. 1). The functionality of the gate drive logic 431 as depicted by the example flow chart of FIG. 7 may be implemented, for example, in an object oriented design or in some other programming architecture. Assuming the functionality is implemented in an object oriented design, then each block represents functionality that may be implemented in one or more methods that are encapsulated in one or more objects. The gate drive logic 431 may be implemented using any one of a number of programming languages as can be appreciated.

Beginning with box 433, the gate drive logic 431 determines whether a voltage sag 106 has been detected. This may be determined by examining the output of the sag detector 213 (FIGS. 2-4) as described above. Assuming that a voltage sag 106 has been detected, then in box 436 the relay 229 (FIGS. 2-4) is opened thereby disrupting the flow of current through the relay 229 to the load 233 (FIGS. 2-4). As such, any reduced current flowing to the load (due to the voltage sag 106) flows to the load 233 through the resistor $R_S$ or does not flow at all as is the case, for example, with the current limiting circuit 300 (FIG. 3). Next, in box 439, the gate drive logic 431 determines whether the power voltage 100 (FIG. 1) has returned to a nominal value. This may be determined based upon a signal 223 (FIGS. 2-4) received from the sag detector 213 that indicates that the voltage sag 106 has ended.

Assuming that such is the case, then the gate drive logic 431 proceeds to box 443 in which it is determined whether to apply the power voltage 100 (FIG. 1) to the load 233. In this respect, the gate drive logic 431 waits for the optimal time to return the power voltage 100 to the load so as to minimize the potential inrush current to the load 233. This determination may be made by examining the output from either the zero crossing detector 209 or the impedance removal timing circuit 403 (FIG. 4) as described above. The zero crossing detector 209 or the impedance removal timing circuit 403 provide a signal 219 or 406 that indicates when the thyristor 226 should be turned on in order to provide current to the load 233 as described above.

Alternatively, the relay 229 may be turned on in box 446 instead of a thyristor 226 where the actual closing of the relay 229 may be timed so as to coincide with a zero crossing or other location on the power voltage cycle, for example, where the future zero crossing or other location on the power voltage cycle can be predicted given a known response time of the relay 229 itself. As such, the gate drive logic 431 would end if the relay 229 is turned on in box 446. However, it should be noted that the relay might be inconsistent in its response time, thereby resulting in variation in when it will actually close and couple the power voltage 100 to the load 233. Thus, the reduction of any inrush current may be adversely affected to some degree.

However, assuming that the thyristor 226 is turned on in box 446, then the gate drive logic 431 proceeds to box 449 to determine whether the surge current has been avoided. This may be determined by allowing a certain period of time to pass within which it is known that any potential current surge is likely to be dissipated.

Then, in box 453, the relay 229 is closed, thereby providing power to the load 233 through the relay 229. Once the relay is closed, then in box 456 the thyristor 226 is turned off since the load 233 is now being supplied through the relay 229. Thereafter the gate drive logic 431 ends as shown.

While the gate drive logic 431, zero crossing detector 209, sag detector 203, and/or the impedance removal timing circuit 403 (FIG. 4) may be embodied in software or code executed by general purpose hardware as discussed above, as an alternative the same may also be embodied in dedicated hardware or a combination of software/general purpose hardware and dedicated hardware. If embodied in dedicated hardware, the gate drive logic 431, zero crossing detector 209, sag detector 203, and/or the impedance removal timing circuit 403 (FIG. 4) can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow chart of FIG. 7 shows the architecture, functionality, and operation of an example implementation of the gate drive logic 431. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although flow chart of FIG. 7 shows a specific order of execution, it is understood that the order of execution may differ from that which is depicted. For example, the order of execution of two or more blocks may be scrambled relative to the order shown. Also, two or more blocks shown in succession in FIG. 7 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the gate drive logic 431, zero crossing detector 209, sag detector 203, and/or the impedance removal timing circuit 403 (FIG. 4) comprises software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the gate drive logic 431, zero crossing detector 209, sag detector 203, and/or the impedance removal timing circuit 403 (FIG. 4) for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present invention are merely possible examples of implementations set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Therefore, having thus described the invention, at least the following is claimed:

1. A method for the reduction of inrush current to an electrical load due to voltage sags on an input power AC voltage, comprising the steps of:
providing a current limiting circuit comprising an selectively removable impedance coupled between the input power AC voltage and the load,
providing a sag detector coupled to receive the input power AC voltage, the sag detector operative to provide a signal corresponding to (i) a beginning of a sag, and (ii) an en of a sag in the input power AC voltage during steady state operation of the load;
providing an impedance removal timing circuit coupled to receive the input power AC voltage and a load voltage as measured across the load, the impedance removal timing circuit operative to provide an impedance removal signal in response to detection that the input power AC voltage is less than the load voltage;
applying the input power AC voltage to the load through the current limiting circuit,
detecting a sag in the input power AC voltage during steady-state operation of the electrical load;
in response to the signal from the sag detector indicating a beginning of a sag, actuating the current limiting circuit to add the impedance between the input power AC voltage and the load;
detecting the end of a sag with the sag detector;
subsequent to the signal from the sag detector indicating an end of a sag, receiving the impedance removal signal from the impedance removal timing circuit; and
in response to the impedance removal signal, reconnecting the input power AC voltage to the load through the current limiting circuit at any point on the power voltage cycle of the input AC power voltage.

2. The method of claim 1, further comprising the step of timing the reconnecting of the input power AC voltage to the load after the power voltage has returned to the nominal voltage so as to reduce an occurrence of an inrush current surge flowing to the load.

3. The method of claim 2, wherein the absolute value of the magnitude of the input power AC voltage is less than the magnitude of a rectified voltage across a capacitor associated with a rectifier of the load at a predefined point in a power voltage cycle when the input power AC voltage is reconnected to the load.

4. The method of claim 1, wherein the input power AC voltage is applied to an inductive load.

5. The method of claim 1, wherein the input power AC voltage is applied to a rectifier capacitor load.

6. The method of claim 1, wherein reconnecting the input power AC voltage to the load occurs at approximately a zero crossing of the input power AC voltage occurring after the input power AC voltage has returned to the nominal voltage.

7. The method of claim 1, wherein reconnecting the input power AC voltage to the load occurs at approximately a first one of a plurality of zero crossings occurring after the input power AC voltage has returned to the nominal voltage.

8. The method of claim 1, wherein reconnecting the input power AC voltage to the load occurs at a point on a power voltage cycle that reduces a differential between an absolute value of a magnitude of the input power AC voltage and a magnitude of a rectified voltage across a capacitor associated with the load to less than or equal to a predefined threshold.

9. The method of claim 1, wherein reconnecting the input power AC voltage to the load occurs at a point in a power voltage cycle where an absolute value of a magnitude of the input power AC voltage is less than a magnitude of a rectified voltage across a capacitor associated with the load.

10. The method of claim 9, wherein at least one diode in a rectifier employed to convert the power voltage is reverse biased when the absolute value of the magnitude of the input power AC voltage is less than the magnitude of the rectified voltage across the capacitor associated with the load.

11. The method of claim 1, wherein the current limiting circuit comprises a parallel arrangement of (a) a selectively actuatable relay and (b) a semiconductor switch in series with a resistance.

12. The method of claim 11, wherein the current limiting circuit further comprises a gate drive coupled to receive the signals indicative of the beginning and end of a sag and the impedance removal timing signal, operative to control the actuation of the relay and the semiconductor switch.

13. The method of claim 12, wherein the gate drive turns on the semiconductor switch in response to receiving the impedance removal timing signal and subsequent to receiving an indication from the sag detector that the voltage sag has ended but prior to actuating the relay for reconnecting the input power AC voltage to the electrical load.

14. The method of claim 11, wherein the step of reconnecting the input power AC voltage to the electrical load further comprises actuating the relay, subsequent to reconnecting the input power AC voltage to the electrical load through the semiconductor switch.

15. The method of claim 11, wherein the conductive pathway provided by the relay presents a path of least resistance for the current flowing to the electrical load.

16. The method of claim 11, wherein the semiconductor switch comprises a thyristor connected in series with the resistance.

17. The method of claim 16, wherein the thyristor is in an off state during steady state operation of the load, thereby preventing current from flowing through the resistance that is connected in series with the thyristor.

18. The method of claim 16, wherein the resistance connected in series with the thyristor limits the worst case current that flows to the electrical load through the thyristor to within a maximum rating of the thyristor.

19. The method of claim 16, where the impedance removal timing circuit provides the impedance removal signal to energize the thyristor to supply the load when conditions other than zero crossing occur that will allow the load to be supplied with the input power AC voltage without causing an inrush current surge.

20. The method of claim 19, wherein the impedance removal timing circuit provides the impedance removal signal when the absolute value of the magnitude of the input power AC voltage is less than the magnitude of the rectified voltage across a capacitor associated with a rectifier of the load.

21. The method of claim 1, further comprising the step of providing a gate drive for controlling the operation of the current limiting circuit, the gate drive responsive to the signals from the sag detector and the impedance removal signal.

22. The method of claim 21, wherein the gate drive controls the operation of a relay to disconnect the input power AC voltage from the load in response to the signal indicating the beginning of a sag.

23. The method of claim 22, wherein the gate drive controls the operation of a semiconductor switch, coupled in parallel with the relay, to reconnect the input power AC voltage to the load in response to the signal indicating the end of a sag and the impedance removal timing signal indicating that a rectified voltage across the load is greater than the absolute value of the input power AC voltage.

24. The method of claim 1 wherein the load voltage is a rectified voltage measured across a capacitor of a capacitor/rectifier associated with the load.

25. The method of claim 1, wherein the impedance removal signal generated by the impedance removal timing circuit is provided at a point on the power voltage cycle of the input power AC voltage that reduces a differential between an absolute value of the input power AC voltage and an absolute value of the magnitude of the rectified voltage measured across the load.

26. The method of claim 1, wherein the end of a sag corresponds to the input power AC voltage returning to a nominal voltage.

27. An apparatus for the reduction of inrush current to an electrical load due to voltage sags on an input power AC voltage, comprising:
   a current limiting circuit including a selectively removable impedance coupled between the input power AC voltage and the electrical load;
   a sag detector coupled to receive the input power AC voltage, the sag detector operative to provide a signal indicating a (i) a beginning of a sag, and (ii) an end of a sag;
   an impedance removal timing circuit coupled to receive the input power AC voltage and a load voltage as measured across the load, the impedance removal timing circuit operative to provide an impedance removal signal in response to detection that the input power AC voltage is less than the load voltage;
   the current limiting circuit being operative, in response to the signal from the sag detector indicating that a sag has begun, to disconnect the input power AC, voltage from the load; and
   the current limiting circuit being operative, in response to the signal from the sag detector indicating that a sag has ended and to the impedance removal signal, to reconnect the input power AC voltage to the load through the current limiting circuit at a predefined point on a power voltage cycle of the input power AC voltage.

28. The apparatus of claim 27, wherein the impedance is a predefined resistance that is applied to limit the current when the input power AC voltage is reconnected to the electrical load.

29. The apparatus of claim 27, wherein the impedance comprises an infinite resistance associated with an open circuit.

30. The apparatus of claim 27, further comprising a circuit configured to time the reconnection of the input power AC voltage to the load after the input power AC voltage has returned to the nominal voltage so as to reduce an inrush current surge flowing to the load.

31. The apparatus of claim 30, further comprising a circuit configured to time the reconnection of the input power AC voltage to the load when the absolute value of the magnitude of the input power AC voltage is less than the magnitude of a rectified voltage across a capacitor associated with a rectifier of the load.

32. The apparatus of claim 27, wherein the load is an inductive load.

33. The apparatus of claim 27, wherein the load is a rectifier/capacitor load.

34. The apparatus of claim 27, wherein the impedance removal timing circuit is configured to time the reconnection of the input power AC voltage to the load at approximately a zero crossing of the input power AC voltage occurring after the input power AC voltage has returned to the nominal voltage.

35. The apparatus of claim 27, wherein the impedance removal timing circuit is configured to time the reconnection of the input power AC voltage to the load at a point on the power voltage cycle that reduces a differential between an absolute value of a magnitude of the input power AC voltage and a magnitude of a rectified voltage across a capacitor associated with the load to less than or equal to a predefined threshold.

36. The apparatus of claim 27, wherein the current limiting circuit comprises a parallel arrangement of (a) a selectively actuatable relay and (b) a semiconductor switch in series with a resistance.

37. The apparatus of claim 36, wherein the current limiting circuit reconnects the input power AC voltage to the load by actuating the relay subsequent to reconnecting the input power AC voltage to the load through the semiconductor switch.

38. The apparatus of claim 36, wherein the conductive pathway provided by the relay presents a path of least resistance for the current flowing to the electrical load.

39. The apparatus of claim 36, wherein the semiconductor switch comprises a thyristor connected in series with the resistance.

40. The apparatus of claim 39, wherein the thyristor is in an off state during steady state operation of the load, thereby preventing current from flowing through the resistance that is connected in series with the thyristor.

41. The apparatus of claim 39, wherein the resistance connected in series with the thyristor limits the worst case current that flows to the load through the thyristor to within a maximum rating of the thyristor.

42. The apparatus of claim 39, where the impedance removal timing circuit provides the impedance removal signal to energize the thyristor to supply the load when conditions other than zero crossing occur that will allow the load to be supplied with the line voltage without causing an inrush current surge.

43. The apparatus of claim 42, wherein the impedance removal timing circuit provides the impedance removal signal when the absolute value of the magnitude of the input power AC voltage is less than the magnitude of the rectified voltage across a capacitor associated with a rectifier of the load.

44. The apparatus of claim 36, wherein the current limiting circuit further comprises a gate drive coupled to receive the signals indicative of the beginning and end of a sag and the impedance removal timing signal, operative to control the actuation of the relay and the semiconductor switch.

45. The apparatus of claim 44, wherein the gate drive turns on the semiconductor switch in response to receiving the impedance removal timing signal and subsequent to receiving an indication from the sag detector that the voltage sag has ended but prior to actuating the relay for reconnecting the input power AC voltage to the load.

46. The apparatus of claim 27, further comprising the step of providing a gate drive for controlling the operation of the current limiting circuit, the gate drive responsive to the signals from the sag detector and the impedance removal signal.

47. The apparatus of claim 46, wherein the gate drive controls the operation of a relay to disconnect the input power AC voltage from the load in response to the signal indicating the beginning of a sag.

48. The apparatus of claim 47, wherein the gate drive controls the operation of a semiconductor switch, coupled in parallel with the relay, to reconnect the input power AC voltage to the load in response to the signal indicating the end of a sag and the impedance removal timing signal indicating that a rectified voltage across the load is greater than the absolute value of the input power AC voltage.

49. The apparatus of claim 27, wherein the load voltage is a rectified voltage measured across a capacitor of a capacitor/rectifier associated with the load.

50. The apparatus of claim 27, wherein the impedance removal signal generated by the impedance removal timing circuit is provided at a point on the power voltage cycle of the input power AC voltage that reduces a differential between an absolute value of the input power AC voltage and an absolute value of the magnitude of the rectified voltage measured across the load.

51. The apparatus of claim 27, wherein the end of a sag corresponds to the input power AC voltage returning to a nominal voltage.

* * * * *